United States Patent [19]

Morrison

[11] Patent Number: 4,518,647
[45] Date of Patent: May 21, 1985

[54] AGRICULTURAL BELTING MATERIAL

[75] Inventor: Donald Morrison, Anthony, Kans.

[73] Assignee: Morrison Company, Inc., Anthony, Kans.

[21] Appl. No.: 619,023

[22] Filed: Jun. 11, 1984

[51] Int. Cl.³ .............................................. B32B 7/00
[52] U.S. Cl. ..................................... 428/250; 198/847; 428/252; 428/257; 428/258; 428/259; 474/271
[58] Field of Search .............. 428/250, 252, 257, 258, 428/259; 198/847; 474/264, 268, 271

[56] References Cited

U.S. PATENT DOCUMENTS

| 3,415,700 | 2/1963 | Webster | 156/164 |
|---|---|---|---|
| 3,593,840 | 7/1971 | Guyer | 198/193 |
| 3,622,416 | 11/1971 | Kunsman | 156/158 |
| 4,031,767 | 6/1977 | Guyer | 198/847 |
| 4,094,402 | 6/1978 | Heeke | 198/847 |
| 4,105,495 | 8/1978 | Pai | 162/348 |
| 4,107,371 | 8/1978 | Dean | 428/255 |
| 4,184,589 | 1/1980 | Habegger | 198/847 |
| 4,371,580 | 2/1983 | Morrison et al. | 428/258 |
| 4,403,632 | 9/1983 | Romanski et al. | 139/383 |
| 4,414,263 | 11/1983 | Miller et al. | 428/234 |

Primary Examiner—James J. Bell
Attorney, Agent, or Firm—Arnold, White & Durkee

[57] ABSTRACT

A material for use in agricultural belting. The material includes a center ply fabric with a relative resistance to stretching, and two outer fabric plies in spaced relation to the center ply, these outer fabric plies offering less resistance to stretching, but a greater flex fatigue life, than the fabric of the center ply. The outer fabric plies include fill yarns including extruded monofilament yarns which impart relative transverse stiffness to the material.

9 Claims, 7 Drawing Figures

AGRICULTURAL BELTING MATERIAL

BACKGROUND OF THE INVENTION

The present invention relates generally to belting, and more specifically relates to belting for use in agricultural equipment such as hay balers.

The design and construction of belting for use in agricultural equipment such as hay balers presents considerations not found in other environments. Belts utilized in hay balers for forming round bales ("round hay balers") may be on the order of 40 feet in length. Throughout their length, the belts must be able to support heavy loads with a minimum of stretching and must withstand extreme environmental conditions without deteriorating.

When a belt for a round hay baler is subjected to heavy loading under operating conditions, the amount that the belt stretches must remain within a certain tolerance or the bale being made will become too large, thereby interfering with proper baler operation, and will not be compacted and formed properly.

The amount of stretch which may occur in belts used on hay balers is not insignificant. For example, a typical maximum specification for elongation of belts for hay balers has been three percent at a specified load. A forty foot belt is thus permitted to stretch up to about fourteen inches under that load. When the belt stretches beyond tolerable limits, the belt is removed and shortened. This shortening of the belt has typically been accomplished by trial and error techniques, especially in the field. Such trial and error techniques can produce unsatisfactory results.

Manufacturers of hay balers have continued to increase the specification for the density of bales which a baler can produce. The amount of loading to which the belts of the baler are subjected in the making of denser bales is increased, and hence the likelihood that a belt will stretch by an amount beyond acceptable limits for proper operation is increased.

Another factor to be considered in belt design is the ability of the belt to flex in operation without the ply material cracking. In that regard, a typical round hay baler employs a plurality of rollers on which the belts are installed. The position of the rollers is such that the belts are subjected to a substantial amount of flexing in traveling around the rollers. Moreover, some of the rollers are positioned such that the belts must travel in and S-shape during operation. If the belts fail due to the flexing stress, the belt must be replaced to recover proper operation of the baler.

Belting having the excellent characteristics of being able to flex in the warp direction while at the same time being resistant to stretching is described in U.S. Pat. No. 4,371,580, which is assigned to the assignee of the present application. The specification of U.S. Pat. No. 4,371,580 is incorporated herein by reference. The belting described in the '580 patent includes three plies of synthetic fabric. The fabric used in each of the outer plies has a flex fatigue life and an elongation modulus which are greater than the respective flex fatigue life and elongation modulus of the fabric used in the center ply. The center fabric ply thus limits the amount that the belt can stretch, while the fabrics used in the outer plies provide the belt with excellent flexing characteristics.

The typical mechanism for connecting the ends of the belt to form a continuous loop is with a "clipper splice" (for example, as shown in FIGS. 3a and 3b). The likelihood of belt failure due to flexing is most pronounced in the vicinity of the clipper splice. The belting of the '580 patent is believed to have solved this problem.

However, prior to the present invention, a problem which still existed in belts for hay balers resulted from the contact between the belt and its guides. Each belt is installed on the baler between a pair of guides, and the guides are essential to prevent the belts from moving transversely and becoming entangled with one another. Each belt is permitted to move sideways between its guides, and in doing so and edge of the belt sometimes contacts the guide on its side. When this happens, the edges of prior art belts do not move away from the guide, but instead the edges often end up "riding" on a guide for successive revolutions of the belt. In this situation, one end of the clipper splice may repeatedly be stuck by the guide, eventually causing the splice to break. Also, when the edge of the belt "rides" on the guide, the belt is prone to "cup", and possibly even to flip over. Neither of these conditions constitutes desirable operating conditions.

SUMMARY OF THE INVENTION

In accordance with the present invention, I have discovered that the useful life of a belt for a hay baler can be extended significantly if contact between the edges of the belt and the belt guides is minimized. In order to minimize such contact, I have developed a belt which is transversely stiff, as compared with prior art hay baler belts and which still has excellent characteristics of flexing and stretch resistance. When such a belt is used on a baler, the edge of the belt tends to move away from a guide upon contacting it.

In one embodiment of the present invention, belting is provided having three fabric plies, a center ply fabric which is relatively resistant to stretching, and a pair of outer plies which are less resistant to stretching but which have a higher flex fatigue life than the central fabric ply. In addition, the fabrics of the outer plies include fill yarns of a type which impart relative transverse stiffness to the belting. In a preferred embodiment, these fill yarns are formed of extruded monofilament yarns, preferably extruded monofilament polyester yarns.

Also in a preferred embodiment, the outer fabric plies are maintained in spaced relation relative to the center ply by the placement of rubber skims between the outer plies and the center ply. Rubber covers are bonded to the exterior of the outer plies to provide resistance to abrasion and to provide a surface for the baling operations.

DESCRIPTION OF SPECIFIC EMBODIMENTS

It will be appreciated that the present invention can take many forms and embodiments. Some embodiments of the invention are described so as to give an understanding of the invention. The embodiments herein described are intended to illustrate, and not to limit, the invention.

Figure 1:
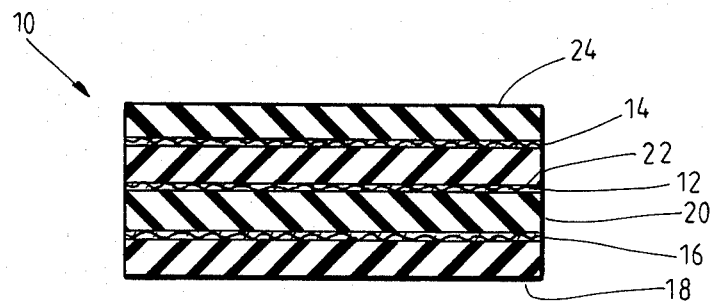
FIG. 1 is a cross-sectional view of a belting in accordance with the present invention, illustrated in vertical section.
Figure 2:
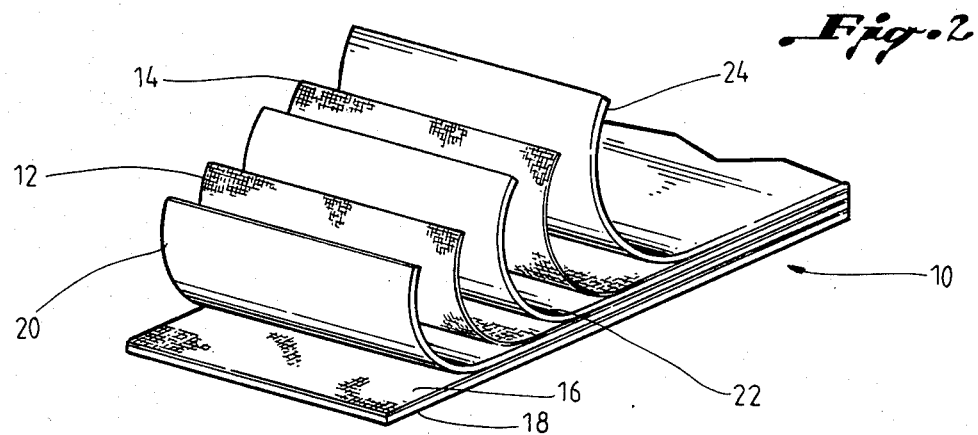
FIG. 2 is a perspective view of belting in accordance with the present invention which depicts the individual plies of the belting material of FIG. 1.

Referring now to the drawings and particularly to FIGS. 1 and 2, there is illustrated a portion of a belting 10 in accordance with the present invention. Belting 10 preferably includes a plurality of synthetic fabric plies interposed between rubber skims. In a particularly preferred embodiment, belt 10 includes three synthetic fabric plies, a center ply 12 of a first synthetic fabric, and outer plies 14, 16 of a second synthetic fabric. The synthetic fabric of outer plies 14, 16 has an elongation modulus and a flex fatigue life which are respectively greater than the elongation modulus and the flex fatigue life of the fabric of center ply 12.

Rubber skims 20, 22 are interposed between each other fabric ply 14, 16 and the center fabric ply 12. The skims thus maintain a spaced relation between each outer fabric ply 14 and 16 and center ply 12. Rubber covers 18, 24 are bonded to the exterior of each outer fabric ply 14, 16. Rubber covers 18, 24 provide abrasion-resistant surfaces for the belt during the baling operation. Rubber skims 20, 22 and rubber covers 18, 24 are preferably identical members. It is particularly preferred that the thickness of skims 20, 22 and covers 18, 24 all be generally equal.

Center fabric ply 12 is preferably a polyester fabric, and most preferably is a fabric woven of Dacron*. In a particularly preferred embodiment, center fabric ply 12 will include two-ply filament polyester yarns in the warp direction, each ply of such warp yarns having a denier of 1,000, the warp yarns thus having a total denier of 2,000. Center fabric ply 12 will include four-ply filament polyester yarns in the fill direction, each ply of such fill yarns also having a denier of 1,000, the fill yarns thus having a total denier of 4,000. A one inch strip of this fabric will preferably have a minimum tensile strength in the warp direction of approximately 1,100 pounds and a minimum tensile strength in the fill direction of approximately 700 pounds. This fabric should have an elongation modulus in the warp direction of 20% to 40% at a load of 550 pounds and an elongation modulus in the fill direction of 20% to 40% at a load of 350 pounds.

*Dacron is believed to be a registered mark of Dupont.

Figure 4:
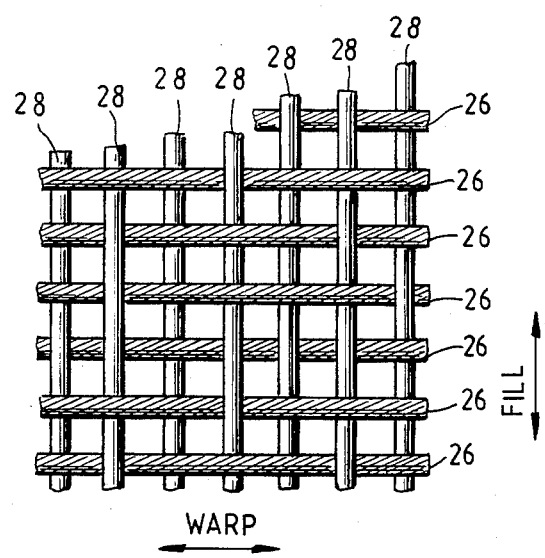
FIG. 4 is a top enlarged view which illustrates the composition of the outer fabric plies of the belting of FIGS. 1 and 2.

Referring now also to FIG. 4, therein is shown an enlarged view of the fabric which is used in outer fabric plies 14, 16. Outer fabric plies 14, 16 include warp yarns 26 of a material which provides good flex fatigue characteristics. These warp yarns are preferably polyamide yarns and most preferably are Nylon** yarns. In a particularly preferred embodiment, these warp yarns are two-ply filament polyester yarns, each ply having a denier of 840, the total yarn having a denier of 1,680. The yarns in the fill direction 28 of at least one, and preferably of both, outer fabric plies 14 and 16, are yarns which exhibit relatively high stiffness. These fill yarns 28 are preferably extruded monofilament yarns. Most preferably, fill yarns 28 are extruded polyester monofilament yarns such as monofilament Dacron, however, extruded monofilament polyamide yarns, such as extruded monofilament Nylon may also be utilized. Also in the particularly preferred embodiment, where fill yarns 28 are extruded monofilament Dacron, Fill yarns 28 will have a denier of 600. A fabric of this particularly preferred type will have a tensile strength in the warp direction of approximately 816 pounds and a tensile strength in the fill direction of approximately 247 pounds. The fabric will have an elongation modulus in the warp direction of approximately 51.4% and an elongation modulus in the fill direction of approximately 50%. Both center fabric ply 12 and outer fabric plies 14, 16 will be provided with a suitable finish to accept rubber.

**Nylon is believed to be a registered mark of Dupont.

The above-described components of belt 10 may be bonded together through conventional techniques. In one such technique, the fabric plies 12, 14 and 16 and rubber skims 20, 22 and rubber covers 18, 24 are primed with an appropriate priming agent such as Resorcinol Formaldehyde Latex (RFL). The belting is then "plied up", whereby rubber skims 20, 22 and rubber covers 18, 24 are placed in the relationship depicted in FIG. 1. The belting is then vulcanized. The RFL causes a chemical bonding between the fabrics and rubber skims during vulcanization.

The belting material may then be cut to lengths and widths as desired.

Figure 3A:
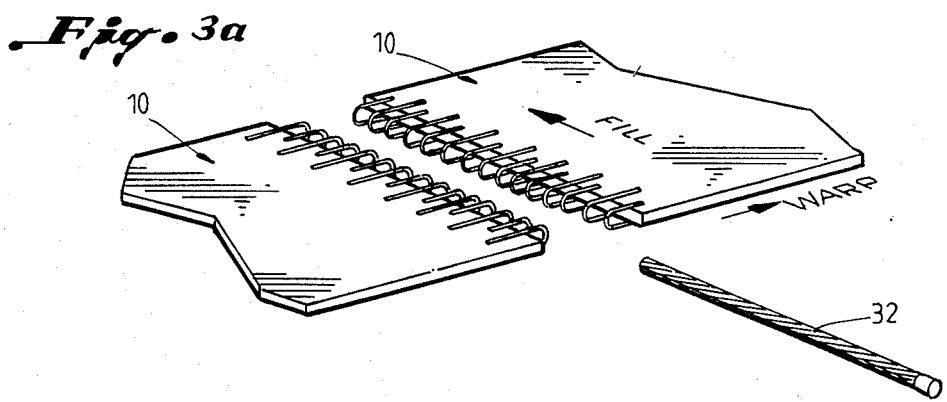
FIGS. 3a and 3b are perspective views of belting which illustrate a "clipper" type splice which is typically used in belting for hay balers.
Figure 3B:
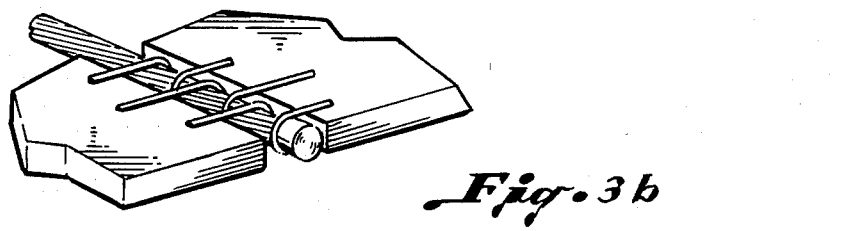

Referring now to FIGS. 3a and 3b of the drawings, there is shown a "clipper splice" at the ends of the belt. A clipper splice is one known mechanism for splicing together the ends of a length of belting to form a continuous loop. With a clipper splice, a plurality of metal eyelets or hooks 30 are connected in each end of the belting. A rod or cable 32, or other suitable retaining member, is passed through the eyelets 30 to join the ends. The ends of rod 32 are suitably formed to prevent removal of the rod and to maintain the integrity of the splice. The clipper splice is typically the "weak link" in a baler belt. Cracks occurring in the belting during use can cause the metal eyelets to work free and the splice to fail. Additionally, the corners of the belt ends provide surfaces which may catch or pull as the ends pass the belt guides.

Figure 5:
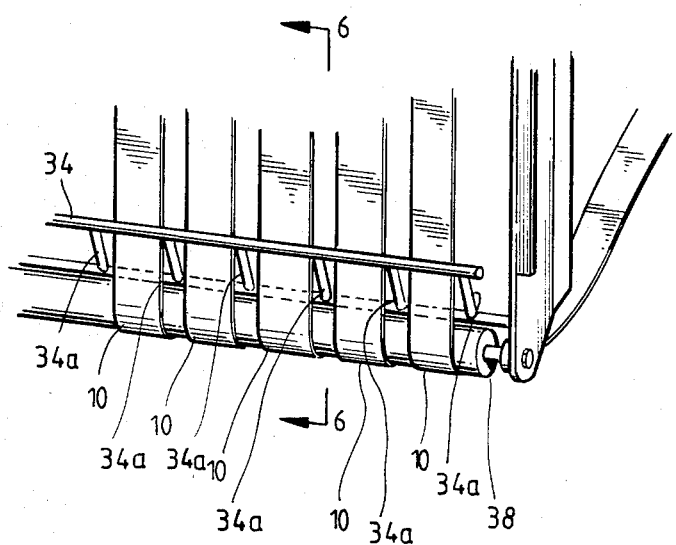
FIG. 5 is the front view of a portion of a hay baler which illustrates a plurality of belts passing between guides in a configuration generally representative of the working environment on a hay baler.
Figure 6:
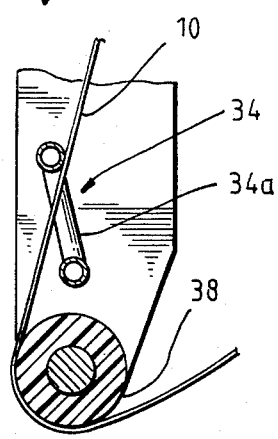
FIG. 6 is a cross-sectional view taken along line 6—6' of FIG. 5.

Referring now to FIGS. 5 and 6 of the drawings, therein is shown in FIG. 5 a plurality of belts 10 passing by belt guides 34 and around an idler roller 38. FIG. 6 is a sectional view taken along the line 6—6' in FIG. 5. The illustrated arrangement is of the type, or similar to the type, typically found on hay balers. Belt guides 34 are utilized to maintain the correct positioning and orientation of the belts as they pass through the baler. Guides 34 may be of different constructions. One common construction, however, is to form guides 34 out of a tubular material such as a pipe. This configuration, especially, may cause problems if belts 10 wear heavily against guides 34. One problem, as mentioned above, is that the hitting of the clipper splice against the guard places additional strain upon the clipper splice which significantly increases the likelihood of failure of the splice. Additionally, it is not uncommon for the abrasion from the edge of a belt against an adjacent guide 34a to cut a notch in the guide itself. When this happens, the belt may tend to ride in the notch and the likelihood of damage to the belt is significantly increased. An entire "ribbon" may be ripped from a belt by the cutting of the notch as the belt passes through it. When the clipper splice hits such a notch, the splice is very likely to be ripped apart, requiring the baler to be shut down while the belt is replaced. This likelihood of damage is further increased when the guides are formed of a tubular product. The worn guide is then even more likely to catch and damage the belt, and particularly to damage the belt splice.

Belts constructed in accordance with the present invention do not tend to "ride against" the guides as do the prior art belts. The transverse stiffness of the belts causes the belts to "bounce" away from the guides upon contact. This feature of belts in accordance with the present invention minimizes detrimental wearing of both the belts and the guides, and promotes optimal service from the baler. Moreover, this transverse stiffness is imparted to the belts without an increase in either the thickness or hardness of the rubber skims of covers relative to prior art belts, either of which would adversely affect the ability of the belt to flex without cracking.

Additionally, as hay is fed into a baler during normal operations, there may be highly uneven loading across the width of a belt. This can sometimes cause a belt to curl up, or "cup", or even to flip over. If the belt flips, the baling operation must be stopped to right the belt. The transverse stiffness of the belt 10 of the present invention minimizes the likelihood of the belts curling or fliping over, because an edge of belt 10 does not remain in contact with a guide for any substantial time.

Many modifications and variations may be made in the techniques and structures described herein and depicted in the accompanying drawings without departing from the spirit and scope of the present invention. Accordingly, it should be readily understood that the embodiments described and illustrated herein are illustrative only and are not intended as limitations on the scope of the present invention.

What is claimed is:

1. A multiple ply material for use in belting, comprising:
    a center fabric ply formed of a first synthetic fabric;
    first and second fabric plies disposed on opposite sides of said center fabric ply, said first and second outer fabric plies including strands in the warp direction which have an elongation modulus and a flex fatigue life which are greater than those of said center fabric ply, said first and second fabric plies having extruded monofilament yarns in the fill direction; and
    a plurality of rubber layers, said rubber layers disposed on opposite sides of said first and second outer fabric plies.

2. The belting material of claim 1, wherein said center fabric ply comprises a polyester fabric.

3. The belting material of claim 2, wherein said polyester fabric comprises dacron.

4. The belting material of claim 1, wherein said strands in the warp direction of at least one of said first and second outer fabrics comprise polyamide yarns.

5. The belting material of claim 4, wherein said polyamide yarns comprise nylon.

6. The belting material of claim 1, wherein said extruded monofilament yarns comprise an extruded polyester monofilament yarn.

7. The belting material of claim 6, wherein said extruded monofilament polyester yarns comprise Dacron.

8. A multiple ply belting material for use in belts for hay balers, comprising:
    a center fabric ply formed of a first synthetic fabric;
    first and second outer fabric plies disposed on opposite sides of said center fabric ply, said first and second outer fabric plies including strands in the warp direction which have an elongation modulus and a flex fatigue life which are greater than those of said center fabric ply, said first and second outer fabric plies having extruded monofilament yarns in the fill direction, and
    a plurality of rubber layers, said rubber layers disposed on opposite sides of said first and second outer fabric plies.

9. A multiple ply material for use in belting for hay balers, comprising:
    a center fabric ply of a polyester material;
    first and second outer fabric plies disposed on opposite sides of said center fabric ply, said first and second outer fabric plies including a material which comprises,
    polyamide warp yarns, and
    extruded monofilament fill yarns; and
    a plurality of rubber layers, said rubber layers disposed on either side of said first and second outer fabric plies and bonded to said first and second outer fabric plies.

* * * * *

UNITED STATES PATENT AND TRADEMARK OFFICE
CERTIFICATE OF CORRECTION

PATENT NO.   : 4,518,647
DATED        : May 21, 1985
INVENTOR(S)  : Donald Morrison It is certified that error appears in the above-identified patent and that said Letters Patent is hereby corrected as shown below:

In column 3, line 63, after "two-ply filament", delete "polyester" and in its place substitute --polyamide--.

Signed and Sealed this

Fifteenth Day of October 1985

[SEAL]

Attest:

Attesting Officer

DONALD J. QUIGG

Commissioner of Patents and
Trademarks—Designate